United States Patent
Kukla et al.

(10) Patent No.: US 12,512,687 B2
(45) Date of Patent: Dec. 30, 2025

(54) METHOD FOR CHARGING AN ENERGY STORE, MOBILE DEVICE AND CHARGING DEVICE

(71) Applicant: Sivantos Pte. Ltd., Singapore (SG)

(72) Inventors: Christoph Kukla, Trabitz (DE); Stefan Aschoff, Eckental (DE)

(73) Assignee: Sivantos Pte. Ltd., Singapore (SG)

( * ) Notice: Subject to any disclaimer, the term of this patent is extended or adjusted under 35 U.S.C. 154(b) by 769 days.

(21) Appl. No.: 17/838,429

(22) Filed: Jun. 13, 2022

(65) Prior Publication Data

US 2022/0399733 A1    Dec. 15, 2022

(30) Foreign Application Priority Data

Jun. 11, 2021   (DE) ............ 10 2021 205 950.3

(51) Int. Cl.
*H02J 7/00* (2006.01)
*G06N 20/00* (2019.01)
*H04R 25/00* (2006.01)

(52) U.S. Cl.
CPC ............ *H02J 7/0071* (2020.01); *G06N 20/00* (2019.01); *H02J 7/0048* (2020.01); *H04R 25/602* (2013.01); *H04R 2225/31* (2013.01)

(58) Field of Classification Search
CPC .... H02J 7/0048; H02J 7/0071; H04R 25/602; H01M 10/44
USPC ....................................................... 320/124
See application file for complete search history.

(56) References Cited

U.S. PATENT DOCUMENTS

| | | | |
|---|---|---|---|
| 8,963,504 B2 | 2/2015 | Kuroda et al. | |
| 9,014,407 B2 | 4/2015 | Boguslavskij et al. | |
| 10,003,113 B1* | 6/2018 | Salinas | H01M 50/262 |
| 2005/0152568 A1* | 7/2005 | Roeck | F17C 11/005 |
| | | | 381/322 |
| 2010/0123436 A1 | 5/2010 | Herrod et al. | |
| 2013/0020993 A1* | 1/2013 | Taddeo | B60L 53/65 |
| | | | 320/109 |
| 2016/0322835 A1* | 11/2016 | Carlson | H02J 7/35 |
| 2017/0013369 A1 | 1/2017 | Renken et al. | |
| 2017/0043674 A1* | 2/2017 | DeBoer, III | B60L 53/63 |

(Continued)

FOREIGN PATENT DOCUMENTS

| | | |
|---|---|---|
| CN | 102217164 A | 10/2011 |
| CN | 102549875 A | 7/2012 |

(Continued)

*Primary Examiner* — David V Henze-Gongola
*Assistant Examiner* — Ryu-Sung P. Weinmann
(74) *Attorney, Agent, or Firm* — Laurence A. Greenberg; Werner H. Stemer; Ralph E. Locher

(57) ABSTRACT

A method charges an energy storage unit of a mobile device, in particular a hearing aid, which is alternately able to be charged in charging phases and able to be used in use phases. For the charging in an upcoming charging phase, a probable duration of the upcoming charging phase and a probable energy consumption of a subsequent use phase are determined based on past charging phases and past use phases. A required charge for the energy storage unit is calculated based on the probable energy consumption. A charging schema for charging the energy storage unit is set for the upcoming charging phase based on the required charge and the probable duration. A mobile device and a charging device are also specified.

20 Claims, 3 Drawing Sheets

(56) References Cited

U.S. PATENT DOCUMENTS

2018/0136708 A1    5/2018  Jahagirdar et al.
2018/0332408 A1*  11/2018  Frei ...................... H02J 7/0071

FOREIGN PATENT DOCUMENTS

| CN | 106815121 A    | 6/2017  |
|----|----------------|---------|
| CN | 109983421 A    | 7/2019  |
| DE | 102014002973 A1 | 6/2015 |
| DE | 102019218616 A1 | 6/2021 |
| EP | 2672731 A1     | 12/2013 |
| EP | 3164781 B1     | 3/2020  |

* cited by examiner

|  | Monday | Tuesday | Wednesday | Thursday | Friday | Saturday | Sunday |
|---|---|---|---|---|---|---|---|
| 05:00 |  |  |  |  |  |  |  |
| 06:00 |  |  |  |  |  |  |  |
| 07:00 | breakfast | breakfast | breakfast | breakfast | breakfast |  |  |
| 08:00 | public transport | public transport | public transport | public transport |  |  | fitness center |
| 09:00 |  |  |  |  |  | breakfast | breakfast |
| 10:00 |  |  |  |  |  |  |  |
| 11:00 |  |  |  |  |  |  |  |
| 12:00 | forest walk | cantine | forest walk | cantine |  |  |  |
| 13:00 |  | 1-1 | team call |  |  |  |  |
| 14:00 |  |  |  |  | public transport |  |  |
| 15:00 |  |  |  |  |  |  |  |
| 16:00 |  |  |  |  |  |  |  |
| 17:00 | public transport | public transport | public transport | public transport |  |  |  |
| 18:00 |  |  | fitness center |  |  |  |  |
| 19:00 |  |  |  |  |  |  |  |
| 20:00 |  |  |  |  |  |  |  |
| 21:00 |  |  |  |  |  |  |  |
| 22:00 |  |  |  |  |  |  |  |
| 23:00 |  |  |  |  |  |  |  |
| 00:00 |  |  |  |  |  |  |  |
| 01:00 |  |  |  |  |  |  |  |
| 02:00 |  |  |  |  |  |  |  |
| 03:00 |  |  |  |  |  |  |  |
| 04:00 |  |  |  |  |  |  |  |

Fig. 6

METHOD FOR CHARGING AN ENERGY STORE, MOBILE DEVICE AND CHARGING DEVICE

CROSS-REFERENCE TO RELATED APPLICATION

This application claims the priority, under 35 U.S.C. § 119, of German Patent Application DE 10 2021 205 950.3, filed Jun. 11, 2021; the prior application is herewith incorporated by reference in its entirety.

FIELD AND BACKGROUND OF THE INVENTION

The invention relates to a method for charging an energy store of a mobile device, in particular a hearing aid, and to a corresponding mobile device. The invention also relates to a charging device.

A mobile device is transportable, has its own energy storage unit for supplying energy and is regularly assigned to an individual user and, if necessary, even individually adapted for said user. The energy storage unit is regularly a secondary cell (for example lithium rechargeable battery) which is able to be charged by connecting the mobile device to a charging device.

A specific example of a mobile device is a hearing aid which is used to provide for a user who has a hearing deficiency. To this end, the hearing aid has a microphone which captures sound from the surroundings and generates an electrical input signal. This is fed to a signal processor of the hearing aid for modification. The modification takes place in particular on the basis of an individual audiogram of the user so that an individual hearing deficiency of the user is compensated. The signal processor outputs as result an electrical output signal, which is then converted back into sound and output to the user via a receiver of the hearing aid. Instead of the microphone and the receiver, other input and/or output transducers are also possible depending on the type of hearing aid.

Other examples for mobile devices are headphones, headsets, wearables, smart phones and similar devices.

The problem is that the energy storage unit is worn through due to repeated charging and discharging, that is to say with an increasing number of charging/discharge cycles, and loses performance; specifically the capacity of the energy storage unit continuously decreases. The energy storage unit thus has a limited service life which varies depending on how the energy storage unit is precisely charged and discharged. The service life is given for example as a number of charging/discharge cycles for which the energy storage unit has a particular minimum capacity. Accordingly, it is desirable to optimize the use of the energy storage unit in terms of the service life thereof.

A paper by Lu, Zhao, et al. entitled "Experimental Investigation on the Charge-Discharge Performance of the Commercial Lithium-ion Batteries", Energy Procedia 143 (2017): 21-26, describes a temperature dependency of the capacity of the energy storage unit.

European patent EP 3 164 781 B1, corresponding to U.S. patent publication No. 2018/0183243, describes a charging apparatus which is configured to be coupled to at least one chargeable apparatus and to carry out a charging session of the chargeable apparatus and which is able to store real-time data during the charging session and, together with an ID of the charging apparatus, to transmit the data to a cloud-based data storage and analysis module. An energy profile behavior is obtained through real-time data of powers and functional parameters.

Published, non-prosecuted German patent application DE 10 2019 218 616 A1 describes a method for operating a hearing system which in an evaluation operation outputs a number of questions to a user and records a number of responses of the user thereto.

In addition, reference is also made to published, non-prosecuted German patent application DE 10 2014 002 973 A1 and European patent application EP 2 672 731 A1, corresponding to U.S. Pat. No. 9,014,407 and U.S. patent publication No. 2013/0328524.

SUMMARY OF THE INVENTION

Against this background, it is an object of the invention to improve the charging of an energy storage unit. In particular, the charging is intended to be optimized in such a way that the highest possible service life for the energy storage unit results, that is to say that it can run through as many charging/discharge cycles as possible. The optimization is intended to be carried out as far as possible so that the user is affected as little as possible. To this end, the intention is to specify a corresponding method; the intention is also to specify a mobile device and a charging device which are suitable for the method.

The object is achieved according to the invention by a method having the features as claimed in the independent method claim and by a mobile device having the features as claimed in the independent mobile device claim and by a charging device having the features as claimed in the independent charging device claim. Advantageous configurations, developments and variants are the subject matter of the dependent claims. The comments in relation to the method also apply, mutatis mutandis, to the mobile device and the charging device and vice versa. If steps of the method are specified below, advantageous configurations for the mobile device in the charging device each result by virtue of the fact that these have a respective control unit which is designed to carry out one or more of the steps.

A central idea of the invention is in particular to optimize the charging of an energy storage unit of a mobile device with knowledge of the past use and charging behavior and to this end to optimally set a charging schema for the charging during an upcoming charging phase based on past use phases and past charging phases of the mobile device. In other words: the method implements intelligent, adaptive charging management.

The method is used to charge an energy storage unit of a mobile device. The mobile device is preferably a hearing aid, alternatively a set of headphones, headset, wearable, smart phone or similar device. The mobile device is transportable, has its own energy storage unit for supplying energy and is in particular assigned to an individual user. The energy storage unit is able to be charged through connection to a charging device. The energy storage unit is for example a lithium rechargeable battery. The mobile device is subsequently also referred to simply as "device"; in addition, the following text deals with a hearing aid without restricting generality, however, the statements also apply analogously to other devices.

The mobile device is alternately able to be charged in charging phases and able to be used in use phases. Use phases and charging phases are mutually exclusive and alternate with one another. A respective use phase thus extends from the end of the preceding charging phase to the beginning of a subsequent phase; the same applies to the charging phases.

During a respective charging phase, the energy storage unit is charged according to a charging schema. The charging schema specifies a respective value or a respective function for one or more charging parameters, for example charging current and charging voltage. The charging schema is implemented in particular by the charging device and is thus used to control the charging device. The charging parameters are able to be set in principle so that different charging schemata can be realized with different values and/or functions. The charging is carried out by means of a charging device to which the mobile device is connected. At the end of the charging phase, the energy storage unit has a charge which corresponds to the total capacity of the energy storage unit (fully charged, that is to say 100% charge) or only to a portion thereof (partially charged, that is to say <100% charge, for example 80% charge). The charge at the end of the charging phase is typically limited by the duration of the charging phase, that is to say by how much time is available for charging.

During a respective use phase, the mobile device is operated using energy from the energy storage unit and as a result has an energy consumption. During the respective use phase, the device is used by the user continuously or with interruption, that is to say it does not necessarily have to consume energy; in any case the energy storage unit is not charged during a use phase, however, and is also not connected to a charging device or to another charging device in particular apart from the charging device described here. The energy consumption during a respective use phase is dependent on the specific use behavior and varies accordingly.

The invention is now based on the observation that typically the energy storage unit discharged as rapidly as possible since the duration of the charging phase is not known. A charging schema with the highest possible charging current is then selected for particularly rapid charging. Furthermore, the energy consumption of the subsequent use phase is also generally not known, for which reason the energy storage unit is charged as fully as possible. However, both charging as rapidly as possible and as fully as possible have a negative effect on the service life of the energy storage unit. For rapid charging, a high charging current is regularly used and produces a lot of waste heat. Therefore, in the present case, the past use and charging phases are advantageously used in order to estimate the duration of the upcoming charging phase and the energy consumption of the subsequent use phase and then to set the charging schema in such a way that the most protective possible charging is carried out during the duration available and that the charge achieved is as sufficient as possible for the subsequent use phase. In this case, use is made in particular of the fact that the use and the charging, that is to say the use and charging behavior, regularly follow a pattern and appropriate predictions about future charging phases and use phases can be made by identifying this pattern. This contradicts published, non-prosecuted German patent application DE 10 2019 218 616 A1 mentioned at the beginning, which does not resort to such identification of patterns but instead requires feedback from the user.

In the present case, for the charging in an upcoming charging phase, a probable duration of the upcoming charging phase and a probable energy consumption of a subsequent use phase are accordingly determined based on past charging phases and based on past use phases. A required charge for the energy storage unit is then calculated based on the probable energy consumption; this is also referred to as "calculation of the charge". The required charge is in particular the charge which is required in order to ensure the probable energy consumption during the subsequent use phase. The determination of the probable energy consumption is also referred to as "prediction of the energy consumption". The determination of the probable duration is also referred to as "prediction of the charging duration". This contradicts DE 10 2019 218 616 A1 mentioned at the beginning, which using the evaluation operation does not typically examine the charging and use behavior with reference to the energy consumption and the charging duration but instead only requests feedback from the user about the operation of the hearing aid in terms of speech intelligibility, volume, tone, interference through background noise, etc. Building on this, the operating parameters of the hearing device are then adapted for a use phase but not a charging schema for a charging phase.

The upcoming charging phase is also referred to as "current" or "next" charging phase and is generally the charging phase which is pending next. In a suitable configuration, the probable energy consumption and the probable duration are determined at the beginning of the upcoming charging phase, for example when the mobile device is connected to the charging device. "Subsequent use phase" is to be understood in particular as the use phase which directly adjoins the upcoming charging phase. "Determine" is also to be understood in particular specifically as "estimated", "calculated", "computed". The duration of the charging phase is also referred to as charging duration or charging period. The use phase also has a duration which is also referred to accordingly as use period or as discharge period.

The charging schema for charging the energy storage unit is then set for the upcoming charging phase based on the required charge and the probable duration. The setting of the charging schema is also referred to as "planning of the charging process". The charging schema is thus adapted using a prediction (more precisely two predictions, specifically on the one hand of the charging duration and on the other hand of the energy consumption), with this prediction being derived from historic data, specifically from the use and charging behavior and therefore from information about past use phases and past charging phases. The charging of the energy store can thus be optimized since the duration of the charging phase and the required charge are now known before the end of the charging phase and in particular at the beginning thereof, with the result that the charging schema is accordingly set in a targeted manner. Unnecessarily rapid and/or full charging is therefore prevented. In an expedient development, unnecessarily rapid and/or for charging is prevented if there is a particular degree of certainty about the next use phase, that is to say the degree of certainty with which the prediction is accurate. The degree of certainty is thus a threshold value which requires a minimum measure of surety for the prediction. If the degree of certainty is not achieved, for example because sufficient data has not yet been collected for this, a surety value is suitably subtracted from the probable duration and/or added to the required charge so that charging then takes place too rapidly or too fully in a restricted scope.

In a suitable configuration, the historic data are only data of the user and are collected for example after a first start-up of the device and in the process for example a standard use behavior and standard charging behavior is assumed. As an alternative, the historic data are initially historic data from other users and these are then added to the data thereof during the use of the device by the user. The charging schema then advantageously continues to adapt overall to the user of the device.

The charging schema is set either by the charging device itself or by another device, for example the mobile device or an additional device or a server, for example of the manufacturer of the device, and then transmitted therefrom to the charging device. Finally, the energy storage unit is then charged using the charging device during the charging phase (that is to say the formerly upcoming charging phase) according to the charging schema; this is also referred to as "performance of the charging process". A configuration in which the user is asked for their typical charging and use behavior before a first start-up and then is assigned to a corresponding cluster of users with similar responses based on the responses is also expedient. The cluster is in turn assigned a typical charging schema which is then initially also used for the user.

The charging schema is preferably set for the upcoming charging phase in such a way that the probable duration of the charging phase is used as best as possible, preferably to the maximum, to achieve the required charge, that is to say in particular in such a way that a service life of the energy storage unit is maximized. Instead of charging the energy storage unit as rapidly as possible on account of an unknown duration of the charging phase, in the present case the lowest possible charging speed is selected, which is just so high that the probably available duration is used to the maximum. As a result, the energy storage unit is charged particularly slowly and thus in a particularly protective manner. For energy storage units for which too slow a charging is disadvantageous, this is expediently taken into account analogously. In this case, without restricting the generality, it is assumed, however, that the slowest possible charging is always advantageous.

In one suitable configuration, the charging schema specifies a charging current for charging and the charging schema is selected in such a way that the charging current is minimized during the probable duration of the upcoming charging phase to achieve the required charging. In this way, particularly protective charging of the energy storage unit is realized. The charging current is selected to be as low as possible but not lower than required to achieve the charging during the charging duration. The charging current is therefore measured in particular in such a way that the energy storage unit is charged to the required charge only at the end of the entire charging duration available, that is to say that the charge has not already been transferred to the energy storage unit at an earlier time. The charging current is as a result measured to be a small as possible and the charging is accordingly protective to the maximum extent. The protective charging is generally also advantageous in ecological terms. If for technical reasons there is a lower limit for the charging current, the charging is expediently divided into at least two phases, specifically into a first phase in which charging takes place using the charging current and a second phase in which charging does not take place, with the result that, despite the lower limit for the charging current, the required charge is nevertheless achieved and is not exceeded despite a longer probable duration. The order of the phases is arbitrary in principle.

Furthermore, it has been identified in the present case that a charge in the region of 85% (or even less) up to 95% of a total capacity, specifically 92% of the total capacity, leads to a significantly longer service life than fully charging, that is to say a charge of 100%. It has thus been observed that a charge of 92% increases the service life of a lithium rechargeable battery for instance by a factor of 2, typically from 1000 charging/discharge cycles to 2000 charging/discharge cycles. In an advantageous configuration, the required charge is therefore rounded up to a maximum value which is at least 65%, preferably at least 85%, and at most 95% of a total capacity of the energy storage unit, particularly preferably 92%. In other words: if a value below the maximum value is initially calculated for the required charge, the required charge is increased to the maximum value. The total capacity is also referred to as "possible total charge" or "nominal capacity".

A notification is expediently output if a value above a maximum value, in particular the maximum value as already described above, is calculated for the required charge. The notification is output in order to prompt a user of the mobile device to adapt the duration of the charging phase or the energy consumption. This is based on the consideration that charging beyond the maximum value is potentially disadvantageous and the user ought to be notified of this accordingly. In order to prevent a lack of energy supply during the subsequent use phase, it is proposed to the user for example to extend the charging duration beyond the previously determined, probable duration. As an alternative or in addition, the user is offered to do without one or more functions of the device or to switch these off during the subsequent use phase in order to reduce the actual energy consumption compared to the previously determined, probable energy consumption. As an alternative or in addition, the user is offered to charge the energy storage unit beyond the maximum value anyway.

In a suitable configuration, the notification is output by the device to the user as an alternative or in addition by the charging device and/or by an additional device which is connected to the device for data exchange, for example the mobile device is a hearing aid and the additional device is a smart phone.

A 24-hour time frame is preferably used in the determination of the probable energy consumption and the probable duration of the upcoming charging phase. This is based on the consideration that the use of the device is dependent on the daily rhythm of the user and accordingly in principle a periodicity with a period of 24 hours can be expected. The 24-hour time frame is therefore advantageous for the evaluation of the past use phases and charging phases and the predictions based thereon. In this case, the beginning and end of the 24-hour time frame do not necessarily fall at 00:00. A hearing aid is typically used during the day and charged at night, that is to say a use phase and a charging phase alternate in a 24-hour rhythm, with the use phase typically being longer than the charging phase. The use phase typically ends before 24:00 but can also go beyond that, for example if the user is a shift worker. Within the 24-hour time frame, the use phase does not necessarily always begin at the same time, but this is at least approximately typically the case. The same applies to the end of the use phase and to the beginning and end of the charging phase. Numerous variations are conceivable, for example a plurality of use phases and charging phases are present within the 24-hour time frame, for example when the device is briefly charged at midday, for example because the user is having a midday nap. Variations also result in particular by virtue of some days being working days and others in turn being weekend days or vacation days or sick days or by virtue of some days being spent working in the office and others at home.

The probable energy consumption and the probable duration of the upcoming charging phase are preferably determined by means of a learning machine which is trained using the past use phases and/or using the past charging phases. The training using the past use phases is in principle independent of the training using the past charging phases but advantageously both are combined. A basic idea is now in particular that the learning machine is supplied with training information from the past use phases and the past charging phases. This training information is suitably the respective duration of the past charging phases and the respective energy consumption of the past use phases. The learning machine derives information about the upcoming charging phase and the subsequent use phase from the training information, suitably directly the duration of the upcoming charging phase and the probable energy consumption of the subsequent use phase. In a suitable configuration, the learning machine is programmed, that is to say in particular a fixed program. In another suitable configuration, the learning machine is an artificial intelligence.

However, the training information is more detailed and comprises information from which the charging duration and the probable energy consumption can be derived, for example beginning and end (that is to say times for example in the form of a time stamp) of a respective charging phase or use phase. As an alternative or in addition, the training information comprises indications about the time at which the mobile device is active, that is to say is in a use phase, the time at which the mobile device is charged, that is to say is in a charging phase, the time at which the mobile device is in which operating state, the time at which the mobile device consumes how much energy. The energy consumption is characterized in particular by the current consumption over a particular period, with the result that the current which is required at a given time is a measure of the energy consumption at this time.

The operating state is for example an audio streaming mode (for example music streaming, that is to say monodirectional audio streaming), a headset mode (that is to say an operating state in which bidirectional audio streaming takes place, for example during a telephone conversation or a video conference), a fitness tracking mode (that is to say an operating state in which one or more sensors, for example a PPG sensor, for monitoring bodily functions are activated, for example for pulse measurement, or for skin resistance measurement), a health monitoring mode (that is to say an operating state for monitoring health in which for example an increased energy consumption by the operation of sensors and evaluation of sensor data is present, specifically at certain times of day), a standard mode (that is to say an operating state in which only or predominantly intended functions of the device are used, in a hearing aid for example a modification to compensate for a hearing deficiency). It is clear from the examples listed that generally the operating states are characterized by a different energy consumption which primarily depends on which components of the mobile device are active for the respective operating state. During a respective use phase, a plurality of different operating states typically alternate, with a respective operating state also being able to be active several times. The knowledge of when and for how long a respective operating state is active then makes it possible to determine the energy consumption and, based on this, then to predict which operating states are active at which time during the subsequent use phase and which energy consumption is produced as a result. For the charging phase, the result is analogously that a prediction of the duration of the upcoming charging phase is then possible owing to the knowledge of the durations of past charging phases. Both are implemented in the present case by means of the learning machine. The learning machine accordingly learns at what time which operating state is active and at what time the mobile device is charged and thus predicts the probable energy consumption and the probable duration.

The learning machine is trained either as part of the method or separately therefrom. To this end, the learning machine monitors during training the operating state of the mobile device and collects and stores the aforementioned training information in the process. As soon as a sufficient amount of training information has been collected and the learning machine has been trained thereby, the machine is then ready for prediction. For example, the number of charging/discharge cycles is counted and from a specific number of charging/discharge cycles, for example 50, it is assumed that a sufficient amount of training information is present and the learning machine is then trained thereby. The training is preferably continued even if the prescribed amount of training information has already been collected, with the result that the database for the prediction continues to increase and it accordingly becomes more reliable.

The learning machine is realized for example by way of a computer program which is executed on a corresponding computer, for example on the mobile device itself, on the charging device, on a server or on an additional device, for example a smart phone, which is connected to the mobile device for data exchange. A distribution of the learning machine across a plurality of the aforementioned computers is also suitable. The learning machine can be realized in principle in a wide variety of ways. The variant described below with a Bayesian network is particularly preferable here.

In a preferred configuration, the learning machine contains a Bayesian network having a plurality of parent nodes which each represent a calendric feature, a location feature or an environmental feature and having a plurality of child nodes which each represent a time interval during which a particular operating state is active. Calendric features, location features and environmental features are generally also each referred to as features so that each parent node generally represents one feature. The combination of an operating state with a time interval is also referred to as feature.

A calendric feature is for example a day of the week, an indication of whether a given day is a vacation day or not, an indication of whether a given day is a business trip day or not or an indication of whether a given day is a holiday and if so which holiday. A location feature generally refers to a particular location or a particular position and to this end comprises for example GPS coordinates or a location name, for example "at home", "office", "gym" and the like. In contrast, an environmental feature generally characterizes the type or the character of an environment, irrespective of the particular location. Examples of environmental features are "inside", "outside", "loud", "quiet", "with background noise", "without background noise" and the like. For example, parent nodes which represent features with possible values as follows result: Day of the week {Mon, Tue, Wed, Thu, Fri, Sat, Sun}, business trip day {yes, no}, vacation day {yes, no}, holiday {Christmas Eve, New Year's Eve, Good Friday, Easter Sunday, Easter Monday; . . . }, location {at home, office, gym, . . . }, environment {inside, outside}.

The child nodes each represent a time interval of an operating state. In the case of a number A of time intervals and a number B of operating states, A*B child nodes result accordingly. When a 24-hour time frame or generally any time frame is used, this is divided into a plurality of time intervals, into consecutive time intervals of 5 minutes long each in one suitable configuration. The time frame and length are variable in principle, however. The time intervals also do not necessarily have to have the same length but this is preferred. Exemplary operating states have already been mentioned further above. For example, a plurality of child nodes result the operating state "fitness tracking mode" as follows: ( . . . , fitness tracking mode 15:00-15:05, fitness tracking mode 15:05-15:10, fitness tracking mode 15:10-15:15, . . . ). Other child nodes result analogously for other operating states.

Each node (that is to say each parent node and each child node) is assigned a conditional probability table, each having a number of certain probabilities, also referred to only as probabilities for short. These probabilities indicate in particular how likely the respective feature is to occur or not, that is to say is satisfied or not. Specifically in the case of child nodes, these probabilities are dependent on the probabilities in the conditional probability tables of the parent nodes which are linked to the respective child nodes. The probabilities are produced within the training of the learning machine based on the past use phases and/or charging phases such that the probability of a respective operating state for a respective time interval is then predicted using the trained learning machine. On the one hand, in this case the probable duration of the upcoming charging phase is determined since during the charging phase none of the operating states is active or the charging itself is an operating state and then accordingly particularly likely in some time intervals and not in others. On the other hand, the probable energy consumption is determined by virtue of it being determined how long which operating state is active during the subsequent use phase and with knowledge of the energy consumption of the respective operating state the energy consumption during the time interval (also referred to as interval energy consumption) is then determined and finally the energy consumption across all time intervals is summed. For a respective time interval, for example the operating state which is most likely for this time interval is predicted as active.

In a suitable configuration, in particular in order to implement the procedure described above, the probable energy consumption is determined by virtue of the subsequent use phase being divided into a plurality of time intervals—in particular by means of the learning machine—and by virtue of an interval energy consumption being determined for each of the time intervals based on the past use phases, the interval energy consumption being an expected value for the probable energy consumption of the mobile device during this time interval. A respective interval energy consumption is suitably determined as the sum of weighted individual energy consumptions, with the weighted individual energy consumptions being determined by virtue of, for each time interval, an individual energy consumption of a respective operating state being weighted with a probability which indicates how likely it is that the respective operating state is active during the time interval, such that a number of weighted individual energy consumptions result for each time interval. The probable energy consumption during the subsequent use phase overall is then determined by virtue of for example the interval energy consumptions being summed. In an expedient configuration, in addition to the interval energy consumptions, a surety supplement is added, for example 20% of the sum of the interval energy consumptions, such that the probable energy consumption then results as the sum of the interval energy consumptions and the surety supplement and the calculated required charge also contains a corresponding surety supplement.

The procedure described above is explained in more detail below: In short, the probability with which and for how long (that is to say in what scope) the individual operating states arise during the subsequent use phase is predicted for the subsequent use phase. Since the energy requirement is known for each operating state, the probable energy consumption is thus also determined. Each operating state represents a current-demanding use and therefore forms during a use phase a proportion of a total used during the use phase. The prediction of the probable energy consumption is expediently based here on the training carried out previously. The subsequent use phase is now first divided into a plurality of time intervals, for example by virtue of a duration of the subsequent use phase being estimated and this duration being divided into a plurality of time intervals. The duration of the use phase is estimated for example based on the duration of the past use phases, in a manner analogous to the determination of the duration of the upcoming charging phase. The time intervals correspond in particular to the time intervals which are also represented by the child nodes. For each of the time intervals, the interval energy consumption during the respective time interval is now determined. For example, for each time interval, the individual energy consumption of a respective operating state of the mobile device is weighted with the probability which indicates how probable it is that the respective operating state is active during the corresponding time interval, such that for each time interval a number of weighted individual energy consumptions result, specifically a weighted individual energy consumption for each operating state. The probabilities are taken in particular from the aforementioned conditional probability tables. The weighted individual energy consumptions are then summed to form the interval energy consumption and specifically for each time interval of the subsequent use phase so that a plurality of interval energy consumptions result, which each constitute an expected value for the probable energy consumption during the respective time interval. These expected values are then likewise summed in order to determine the probable energy consumption during the subsequent use phase.

The probable duration of the upcoming charging phase is preferably—as already indicated—determined based on the durations of the past charging phases. In principle, therefore, a charging behavior of the user is monitored, that is to say when and/or how long the mobile device is connected to a charging device for charging is monitored. The duration of a respective past charging phase is for example measured directly or derived indirectly from the beginning and end of the past use phases since these alternate with the charging phases and in particular a charging phase always directly follows a use phase and vice versa.

Advantages of the invention consist in particular in that the service life of the energy storage unit is extended without a change in behavior with respect to the use and the charging of the mobile device being requested by the user. Instead, the charging is adapted to the individual use and charging behavior of the user by virtue of this use and charging behavior first being monitored and then a prediction of the future use and charging behavior being made based on this, specifically the probable energy consumption and the probable duration. Based on this prediction, the charging schema is then optimally set in order to optimally solve the conflicting goals of the most efficient possible charge and the most protective possible charging. In this case, in principle, it is also possible to draw the conclusion that the energy storage unit is not charged at all in an upcoming charging phase although it is connected to the charging device, for example because the charging phase is only short, for example only a few minutes long. Conversely, it is also possible to draw the conclusion that a required charge is not possible at all during the available duration. In this case, an appropriate notification is expediently output to the user for example via the mobile device or via the charging device, for example in such a way that an additional or longer charging phase is required. As an alternative or in addition, one or more functions of the mobile device, in particular those with only a low relevance, are deactivated during the subsequent use phase in order to reduce the actual energy consumption. The user is expediently informed about this accordingly. The use and charging behavior, that is to say the energy consumption during the past use phases and the durations of past charging phases, is advantageously considered from a charging perspective for the energy storage unit since the energy consumption and together with the charging also the energy supply are monitored and the information obtained therefrom is used for the described predictions.

In particular, by taking into consideration various features as described further above, a comparatively complex use and charging behavior can also be used for a prediction. In this case, "complex" is to be understood in particular as meaning that the use and charging behavior not only follows the selected time frame, for example a 24-hour rhythm, but for example that a use of the mobile device on workdays (Monday to Friday) differs from the use on the weekend (Saturday, Sunday). In particular, certain regular activities of the user on certain weekdays or days of the month or the year or at an equal spacing between them are also taken into account, for example a weekly meeting or a visit to a gym every two days.

The use and charging behavior significantly determine the energy consumption of the mobile device and the required charge. For example, uses specifically of a hearing aid with different energy consumption are sport, gardening, telephone calls, evening entertainment, eating lunch, listening to an audio book on public transport, working, cooking with the family, watching the news. For example, the user uses a headset mode on workdays in order to call colleagues. In the headset mode, the device typically has a high energy consumption because an RF antenna of the device is used. In another example, the user regularly, for example daily or weekly, has meetings with other people over a relatively long time, such that a corresponding energy demand is conceivable. Specifically in such a case, however also advantageously in general, a calendar of the user is expediently accessed in order to identify and predict use phases and specifically the use of particular operating states. The calendar is stored for example on the device itself or on additional device which is connected to the mobile device for data exchange. In another example, the use and charging behavior contains the fact that the user spends specific times or days in a quiet environment, for example in order to read a book, and in the process uses comparatively few functions of the device, as a result of which the energy consumption is correspondingly low. In another example, the use and charging behavior comprises a specific time pattern during charging, for example the device is connected to a charging device for charging only once per day, for example overnight, the device is charged several times a day, for example additionally during a break or lunch break or during a short sleep during the day, the device is charged at any opportunity irrespective of the state of charge, the device is charged only when a minimum charge has been undershot. The charging behavior can also be entirely unspecific and exhibit no pattern.

Apart from a use for optimizing the charging schema when charging the energy storage unit, the information regarding use and charging behavior can also be used for the operation of the mobile device, for example to stipulate an input (in particular operating parameters) for a sensor measurement in particular for a health application, for example to stipulate a PPG measurement frequency for a PPG sensor for PPG measurement. The sensor measurement is carried out using a sensor which is expediently accommodated in the device. In a preferred configuration, the probable energy requirement and/or the probable duration are accordingly used to stipulate an input for a sensor measurement. If for example during the subsequent use phase a sporting activity of the user is expected, that is to say the probability for a corresponding operating state exceeds a particular limit value in one or more time intervals, more required to charge is taken into account for a sensor measurement carried out here in order to improve sensor measurement during the sporting activity, for example in order to increase a measurement frequency of the sensor measurement. Conversely, it is also advantageously possible to recognize that the sensor measurement is possibly no longer currently required and thus the required charge is reduced.

An advantageous mobile device is designed for use in a method as described above. To this end, the mobile device has in particular a control unit which is designed to carry out the method.

The mobile device is preferably a hearing aid. This has the advantage in particular that structures which are already present in the hearing aid are used for the method. Such a structure is for example a control unit which activates or deactivates a respective operating state and also monitors this and stores this information accordingly. A further advantage of a hearing aid is that it is regularly predominantly active over the day and is at least not fully deactivated even during charging and thus is continuously switched on.

The hearing aid is designed in particular to provide for a user who has a hearing deficiency. To this end, in one possible configuration, the hearing aid has a microphone which captures sound from the surroundings and generates an electrical input signal. This is fed to a signal processor of the hearing aid for modification. The modification takes place in particular on the basis of an individual audiogram of the user so that an individual hearing deficiency of the user is compensated. The signal processor outputs as result an electrical output signal, which is then converted back into sound and output to the user via a receiver of the hearing aid in a suitable configuration. Depending on the type of hearing aid, instead of the microphone, other input transducers are also possible; analogously, instead of the receiver, other output transducers are also possible depending on the type of hearing aid.

In a preferred configuration, speech content is recorded and analyzed using the mobile device in order to obtain additional information for using the mobile device, for example accepted or rejected appointments are identified.

Analogously, an advantageous charging device is configured to charge an energy storage unit of a mobile device as described above according to a method as described above. To this end, the charging device has in particular a control unit which is configured to carry out the method and thereby to charge the mobile device, more precisely the energy storage unit thereof. The use of the charging device for the method has the advantage in particular that the charging device constitutes a reliable backup if the energy storage unit of the mobile device is at one time depleted to the extent that it must be fully deactivated and then is no longer available for the method, specifically for prediction. The charging device is also typically subjected to less restrictive installation space and energy consumption restrictions and the mobile device, with the result that the charging device can be configured and expediently also is designed with a particularly high computation capacity, storage capacity and/or a permanent Internet connection. When the method is carried out on the charging device, energy can accordingly also advantageously be saved in the mobile device.

In an advantageous configuration, the charging device is a mobile charging device and thus itself has a secondary cell as energy storage unit from which the mobile device is able to be charged. The secondary cell is in particular a lithium rechargeable battery. In an advantageous development, the charging device also has an additional energy storage unit, in particular a fuel cell, in order to charge the secondary cell. Such a charging device is also referred to as "hybrid charging device". The additional energy storage unit is dimensioned in particular in such a way that in connection with the secondary cell it provides more than an individual 100% charge for the mobile device. The described method is then also advantageously used to charge the secondary cell from the additional energy storage unit as optimally as possible. In addition to the required charge for the mobile device, a charge for the secondary cell is then also calculated based on the past use phases and/or charging phases. This is advantageous when the charging from the additional energy storage unit is slow in comparison to the charging from the secondary cell, with the result that, through knowledge of the use and charging behavior, the charging of the secondary cell is then also optimized, specifically in such a way that the secondary cell is also charged in as protective a manner as possible as already described. This is typically the case in a fuel cell as additional energy storage unit.

A configuration in which the method is executed on a server, in particular as a cloud service, is also advantageous. The server is connected to the charging device and/or the mobile device via a data connection, for example Internet. This configuration has the advantage that a server typically has a significantly greater computation capacity and in the future it can be predicted that information about past use phases and charging phases are stored on such a server anyway and currently not locally on the mobile device or the charging device and then expediently can also be processed directly there, that is to say can be used for the method described here.

The described performances of the method on the mobile device, the charging device or the server are also advantageously able to be combined, for example in such a way that the steps of the method are distributed across two or more of these devices.

Other features which are considered as characteristic for the invention are set forth in the appended claims.

Although the invention is illustrated and described herein as embodied in a method for charging an energy store, a mobile device and a charging device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 6 is an illustration showing various activities of a user over a week.

DETAILED DESCRIPTION OF THE INVENTION

Figure 1:
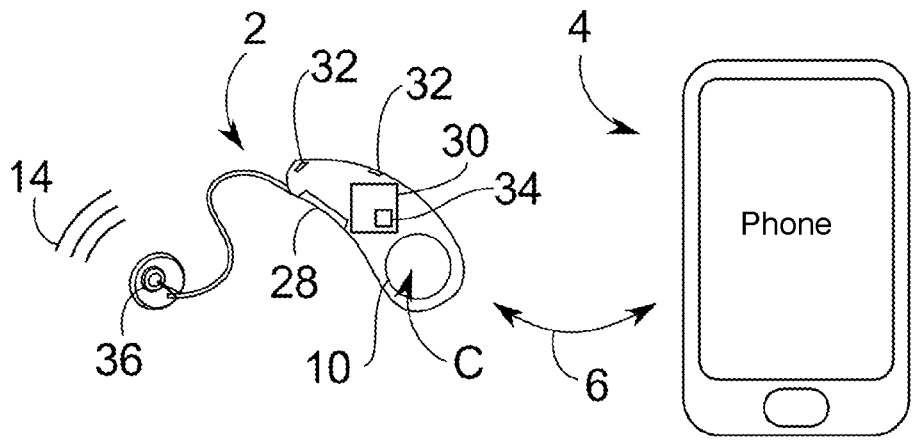
FIG. 1 is an illustration showing a mobile device and an additional device according to the invention.
Figure 2:
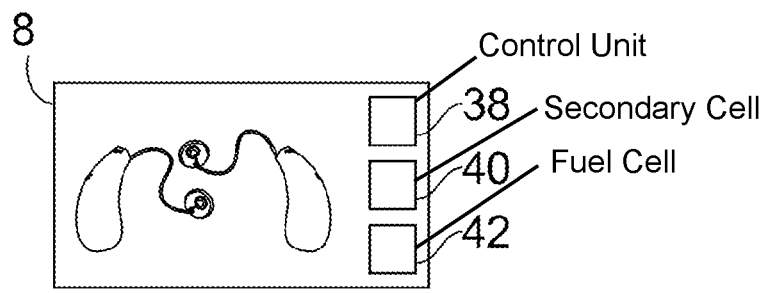
FIG. 2 is an illustration showing the mobile device from FIG. 1 and a charging device.

Referring now to the figures of the drawings in detail and first, particularly to FIG. 1 thereof, there is shown an exemplary embodiment of a mobile device 2 which in this case is a hearing aid, specifically a binaural hearing aid; however, the subsequent embodiments also apply analogously to other configurations of the device 2. FIG. 1 also shows an optional additional device 4, in this case a smart phone, which is connected to the device 2 via a data connection 6. FIG. 2 then shows the device 2 from FIG. 1 with a charging device 8, to which the device 2 is able to be connected, for charging an energy storage unit 10 of the device. The charging device 8 shown here is designed as a box purely by way of example, in which the device 2 is inserted for connection to the charging device 8 and for charging the energy storage unit 10. FIG. 1 shows only one of two individual devices of the binaural hearing aids; both individual devices are shown in FIG. 2.

Figure 3:
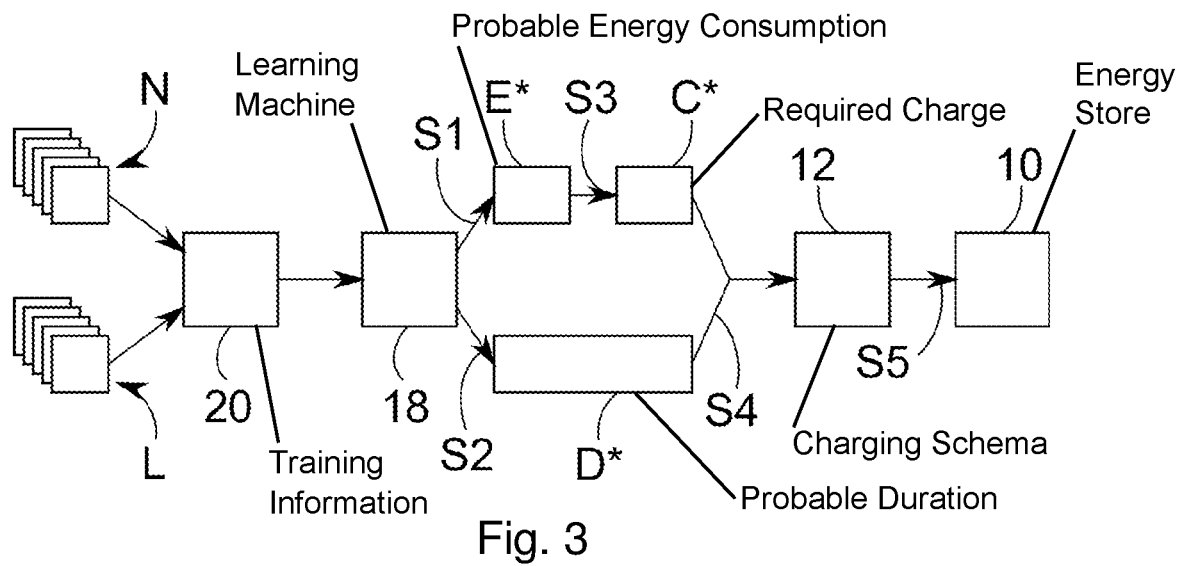
FIG. 3 is a block diagram for explaining a method.

Exemplary embodiments of a method for charging the energy storage unit 10 of the mobile device 2 are explained below with reference to the figures. A specific exemplary embodiment of the method is shown in FIG. 3. The mobile device 2 is alternately able to be charged in charging phases L, L* and able to be used in use phases N, N*. Use phases N, N* and charging phases L, L* are mutually exclusive and alternate with one another. This is shown schematically in FIG. 3, which shows a sequence of use and charging phases N, N*, L, L* by way of example. During a respective charging phase L, L*, the energy storage unit 10 is charged according to a charging schema 12. At the end of the charging phase L, L*, the energy storage unit 10 has a charge which corresponds to the total capacity of the energy storage unit 10 (fully charged, that is to say 100% charge) or only to a portion thereof (partially charged, that is to say <100% charge).

During a respective use phase N, N*, the mobile device 2 is operated using energy from the energy storage unit 10 and is a result has an energy consumption E. The energy consumption E during a use phase N is indicated in each case by a double arrow in FIG. 3. During the respective use phase N, N*, the device 2 is used continuously or with interruption and is not connected to a charging device 8. The energy consumption E,E* during a respective use phase N, N* is dependent on the specific use behavior and varies accordingly.

In the present case, for charging in an upcoming charging phase L*, a probable duration D* of the upcoming charging phase L* and a probable energy consumption E* of a subsequent use phase N* are determined based on past charging phases L and based on past use phases N. A required charge C* for the energy storage unit 10 is then calculated based on the probable energy consumption E*; this is also referred to as "calculation of the charge". The required charge C* is the charge C which is required in order to ensure the probable energy consumption E* during the subsequent use phase N*. The determination of the probable energy consumption E* is also referred to as "prediction of the energy consumption" and is characterized in FIG. 3 as a step S1. The determination of the probable duration D* is also referred to as "prediction of the charging duration" and is characterized in FIG. 3 as a step S2. The "calculation of the charge" is characterized in FIG. 3 as a step S3.

The upcoming charging phase L* is generally the charging phase which is pending next. The probable energy consumption E* and the probable duration D* are determined for example at the beginning of the upcoming charging phase L*, for example when the mobile device 2 is connected to the charging device 8. "Subsequent use phase" N* is to be understood as the use phase which directly adjoins the upcoming charging phase L*. The duration D, D* of a charging phase L, L* is also referred to as charging duration or charging period. The use phase N* also has a duration which is also referred to accordingly as use period or as discharge period.

The charging schema 12 is set for the upcoming charging phase L* based on the required charge C* and the probable duration D*. The setting of the charging schema 12 is also referred to as "planning of the charging process" and is characterized in FIG. 3 as a step S4. The charging schema 12 is accordingly adapted using a prediction (more precisely two predictions, in this case the steps S1, S2) which is derived from historic data, specifically from the use and charging behavior and thus from information about past use and charging phases N, L. The charging of the energy storage unit 10 is thus optimized because the duration D* of the charging phase L* and the required charge C* are now known for example already at the beginning of the upcoming charging phase L*, with the result that the charging schema 12 is accordingly set in a targeted manner and unnecessarily rapid and/or full charging is avoided.

Finally, the energy storage device 10 is then charged during the charging phase L* (that is to say the formerly upcoming charging phase L*) according to the charging schema 12; this is also referred to as "performance of the charging process" and is characterized in FIG. 3 as step S5.

In the exemplary embodiment shown, the charging schema 12 is set for the upcoming charging phase L* in such a way that the probable duration D* is used to the maximum to achieve the required charge C*. Instead of charging the energy storage unit 10 as rapidly as possible, in the present case the lowest possible charging speed is selected, which is just so high that the probably available duration D* is used to the maximum. In the present case, the charging schema 12 also specifies a charging current for the charging and is selected in such a way that, in order to achieve the required charge C* during the probable duration D*, the charging current is minimized, specifically selected to be as low as possible but not lower than necessary to achieve the charge C* during the charging period D*.

Optionally, the required charge C* is rounded up to a maximum value which is least 85% and at most 95% of a total capacity of the energy storage unit 10, for example 92%. A notification 14 is optionally output if a value above the mentioned maximum value is calculated for the required charge C*. In order to prevent a lack of energy supply E during the subsequent use phase N*, it is proposed to the user for example to extend the charging duration D beyond the previously determined, probable duration D*. As an alternative or in addition, the user is offered to do without one or more functions of the device 2 or to switch these off during the subsequent use phase N* in order to reduce the actual energy consumption E compared to the previously determined, probable energy consumption E*. As an alternative or in addition, the user is offered to charge the energy storage unit 10 beyond the maximum value anyway. In FIG. 1, the notification 14 is output by the device 2 to the user for example as an acoustic notification, as an alternative or in addition by the charging device 8 and/or by the additional device 4.

Figure 4:
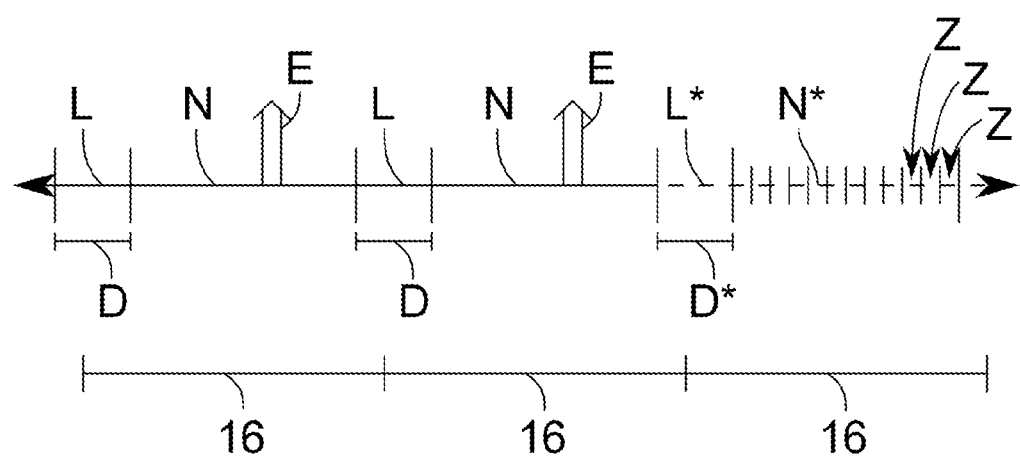
FIG. 4 is an illustration showing use and charging phases over time.

A 24-hour time frame 16 used in the determination of the probable energy consumption E* and the probable duration D* in the present case. An exemplary embodiment of this is shown in FIG. 4. In this figure, the alternating sequence of use and charging phases N, N*, L, L* can be seen as well as an upcoming charging phase L* and a subsequent use phase N*. The beginning and end of the 24-hour time frame 16 do not necessarily fall at 00:00. A hearing aid is typically used during the day and charged at night, that is to say a use phase N and a charging phase L alternate in a 24-hour rhythm. Within the 24-hour time frame 16, the use phase N does not necessarily always begin at the same time. The same applies to the end of the use phase N and to the beginning or end of the charging phase L. Numerous variations are conceivable; for example, in a variant not shown explicitly, a plurality of use and charging phases N, L are present within an individual 24-hour time frame 16; in this respect FIG. 1 shows only one single possible configuration from a plurality of possible configurations.

In the exemplary embodiment shows, the probable energy consumption E* and the probable duration D* are determined by means of a learning machine 18 which is trained using the past use phases N and using the past charging phases L. The learning machine 18 is supplied with training information 20 from the past use phases N and the past charging phases L. The learning machine 18 then derives information about the upcoming charging phase L* and the subsequent use phase N* from the training information 20, for example directly the duration D* and the probable energy consumption E*. The training information 20 is for example the respective duration D of the past charging phases L and the respective energy consumption E of the past use phases N or is more detailed in comparison and comprises information from which the charging duration D*and the probable energy consumption E* can be derived. For example, the training information 20 comprises the beginning and end of a respective charging phase L or use phase N, indications about the time at which the device 2 is active or charged, the time at which the device 2 is in which operating state B or the time at which the device 2 consumes how much energy.

The operating state B is for example an audio streaming mode, a headset mode, a fitness tracking mode, a health monitoring mode or a standard mode. The operating states B are typically characterized by a different energy consumption E which primarily depends on which components of the mobile device 2 are active for the respective operating state B. During a respective use phase N, a plurality of different operating states B typically alternate, with a respective operating state B also being able to be active several times. In the present case, the learning machine 18 learns at what time which operating state B is active and at what time the mobile device 2 is charged and thus predicts the probable energy consumption E* and the probable duration D*.

The learning machine 18 is trained either as part of the method or separately therefrom. The learning machine 18 monitors during training the operating state B of the mobile device 2 and collects and stores the aforementioned training information 20 in the process. As soon as a sufficient amount of training information 20 has been collected and the learning machine 18 has been trained thereby, the machine is then ready for prediction. For example, the number of charging/discharge cycles is counted and from a specific number of charging/discharge cycles, it is assumed that a sufficient amount of training information 20 is present and the learning machine 18 is then trained thereby.

The learning machine 18 is realized for example by way of a computer program which is executed on a corresponding computer, for example on the mobile device 2 itself, on the charging device 8, on a server or on an additional device 4 or distributed across several devices.

Figure 5:
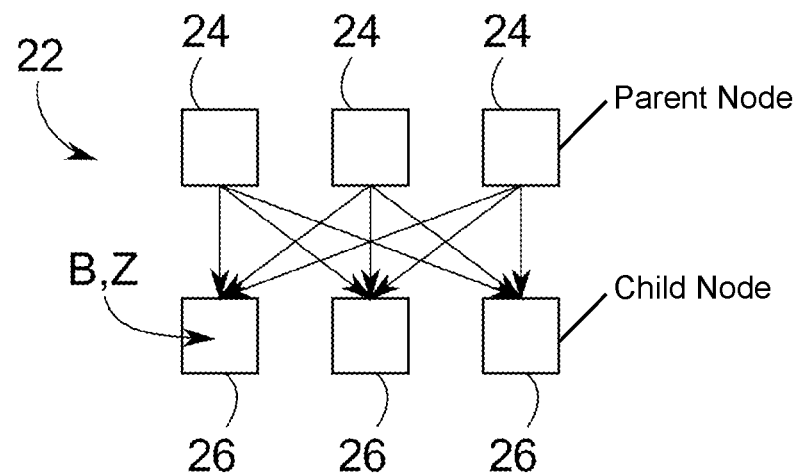
FIG. 5 is a block diagram showing sections of a Bayesian network; sand

In the exemplary embodiment shown here, the learning machine 18 contains a Bayesian network 22, for example as shown only in sections in FIG. 5, having a plurality of parent nodes 24 which each represent a calendric feature, a location feature or an environmental feature and having a plurality of child nodes 26 which each represent a time interval during which a particular operating state B is active. Calendric features, location features and environmental features are generally also each referred to as features so that each parent node 24 generally represents one feature. For example, parent nodes 24 which represent features with possible values as follows result: Day of the week {Mon, Tue, Wed, Thu, Fri, Sat, Sun}, business trip day {yes, no}, vacation day {yes, no}, holiday {Christmas Eve, New Year's Eve, Good Friday, Easter Sunday, Easter Monday; . . . }, location {at home, office, gym, . . . }, environment {inside, outside}.

The child nodes 26 each represent a time interval Z of an operating state B. In the case of a number A of time intervals Z and a number B of operating states B, A*B child nodes 26 result accordingly. When a 24-hour time frame 16 or generally any time frame is used, this is divided into a plurality of time intervals Z, for example into consecutive time intervals Z of 5 minutes long each for example. The time frame and length are variable in principle, however. In the present case, the time intervals Z have the same length but this is not compulsory. Exemplary operating states B have been mentioned already further above. For example, a plurality of child nodes 26 then result for the operating state B of "fitness tracking mode" as follows: ( . . . , fitness tracking mode 15:00-15:05, fitness tracking mode 15:05-15:10, fitness tracking mode 15:10-15:15, . . . ). Other child nodes 26 result analogously for other operating states B. In FIG. 5, each child node 26 represents another combination of an operating state B and a time interval Z.

Each node 24, 26 is also assigned a conditional probability table, each having a number of certain probabilities, also referred to only as probabilities for short. These probabilities indicate how likely the respective feature is to occur or not, that is to say is satisfied or not. Specifically in the case of child nodes 26, these probabilities are dependent on the probabilities in the conditional probability tables of the parent nodes 24 which are linked to the respective child nodes 26. The probabilities are produced within the training of the learning machine 18 based on the past use phases and/or charging phases N, L such that the probability of a respective operating state B for a respective time interval Z is then predicted using the trained learning machine 18. On the one hand, in this case the probable duration D* is determined. On the other hand, the probable energy consumption E* is determined.

In an exemplary implementation of the procedure described above, the probable energy consumption E* is determined by virtue of the subsequent use phase N* as indicated in FIG. 3 being divided into a plurality of time intervals Z and by virtue of an interval energy consumption being determined for each of the time intervals Z based on the past use phases N*, the interval energy consumption being an expected value for the probable energy consumption E* of the device 2 during this time interval Z. A respective interval energy consumption is determined for example as the sum of weighted individual energy consumptions, with the weighted individual energy consumptions being determined by virtue of, for each time interval Z, an individual energy consumption of a respective operating state B being weighted with a probability which indicates how likely it is that the respective operating state B is active during the time interval Z. A number of weighted individual energy consumptions which are then summed to form the interval energy consumption thus result for each time interval Z. The probable energy consumption E* during the subsequent use phase N* overall is then determined by virtue of the interval energy consumptions being summed in turn. Optionally, in addition to the interval energy consumptions, a surety supplement is added, for example 20% of the sum of the interval energy consumptions.

Therefore, the probability with which and for how long the individual operating states B arise during the subsequent use N* phase is predicted for the subsequent use phase N*. Since the energy requirement E is known for each operating state B, the probable energy consumption E* is thus also determined. The prediction of the probable energy consumption E* is based here on the training carried out previously. The subsequent use phase N* is now first divided into a plurality of time intervals Z which in the present case correspond to the time intervals Z which are represented by the child nodes 26. For each of the time intervals Z, the interval energy consumption during the respective time interval Z is now determined by virtue of, for each time interval Z, the individual energy consumption of a respective operating state B is weighted with the probability which indicates how probable it is that the respective operating state B is active during the corresponding time interval Z, with the result that, for each time interval Z, a number of weighted individual energy consumptions results, specifically a weighted individual energy consumption for each operating state B. The probabilities are taken from the aforementioned conditional probability tables. The weighted individual energy consumptions are then summed to form the interval energy consumption and specifically for each time interval Z of the subsequent use phase N* so that a plurality of interval energy consumptions result, which each constitute an expected value for the probable energy consumption during the respective time interval Z. These expected values are then likewise summed in order to determine the probable energy consumption E* during the subsequent use phase N*.

The probable duration D* is determined for example based on the durations D of the past charging phases L. In principle, therefore, a charging behavior of the user is monitored, that is to say when and/or how long the device 2 is connected to a charging device 8 for charging is monitored.

By taking into consideration various features as described further above, a comparatively complex use and charging behavior can also be used for a prediction. In this case, "complex" is to be understood in particular as meaning that the use and charging behavior not only follows the selected time frame, for example a 24-hour rhythm, but for example that a use of the mobile device 2 on work days (Monday to Friday) differs from the use on the weekend (Saturday, Sunday). For example, certain regular activities of the user on certain week days or days of the month of the year or at an equal spacing between them are also taken into account, for example a weekly meeting or a visit to a gym every two days. An example of a pattern of various activities over a week is shown in FIG. 6. Here, a time of day is given in the first column and various activities are given in the subsequent columns for each day of the week, during which corresponding operating states B of the device 2 are active. In the event of a "1-1" or a "team call", for example it is the headset mode and in the event of "fitness center" it is the fitness tracking mode.

Apart from a use for optimizing the charging schema 12 when charging the energy storage unit 10, the information regarding use and charging behavior can also be used for the operation of the mobile device 2, for example to stipulate an input (in particular operating parameters) for a sensor measurement using a sensor 28, which in this case is accommodated in the device 2. In an optional configuration, the probable energy requirement E* and/or the probable duration D* are accordingly used to stipulate an input for a sensor measurement.

The mobile device 2 shown here is designed for use in a method as described above and to this end has a control unit 30. As already indicated, the device 2 shown here is a hearing aid. The hearing aid is designed in the present case to provide for a user who has a hearing deficiency. To this end, the hearing aid has a microphone 32 which captures sound from the environment and generates an electrical input signal. This is fed to a signal processor 34 of the hearing aid for modification. The modification takes place on the basis of an individual audiogram of the user so that an individual hearing deficit of the user is compensated. The signal processor 34 outputs as result an electrical output signal, which is then converted back into sound and output to the user via a receiver 36. Depending on the type of hearing aid, instead of the microphone 32, other input transducers are also possible; analogously, instead of the receiver 36, other output transducers are also possible depending on the type of hearing aid.

Analogously, an advantageous charging device 8 is designed to charge a mobile device 2 as described above according to a method as described above. To this end, the charging device 8 has a control unit 38 which is designed to carry out the method and thereby to charge the mobile device 2, more precisely the energy storage unit 10 thereof. The charging device shown here by way of example is to this end a mobile charging device and thus itself has a secondary cell 40 as energy storage unit from which the mobile device 2 is able to be charged. In addition, the charging device 8 also has an optional fuel cell 42 as an additional energy storage unit in order to charge the secondary cell 40. The described method is then also used in order to charge the secondary cell 40 from the fuel cell 42 as optimally as possible. In addition to the required charge C* for the mobile device 2, a charge for the secondary cell 40 is then also calculated based on the past use phases and/or charging phases N, L.

In a configuration not explicitly shown, the method is executed on a server, for example as a cloud service. The server is connected to the charging device 8 and/or the mobile device 2 via a data connection, for example Internet. The described performances of the method on the mobile device 2, the charging device 8 or the server are also advantageously able to be combined, for example in such a way that the steps of the method are distributed across two or more of these devices.

The following is a summary list of reference numerals and the corresponding structure used in the above description of the invention:

2 Mobile device
4 Additional device
6 Data connection
8 Charging device
10 Energy storage unit
12 Charging schema
14 Notification
16 24 h time frame
18 Learning machine
20 Training information
22 Bayesian network
24 Parent node
26 Child node
28 Sensor
30 Control unit (of the mobile device)
32 Microphone
34 Signal processor
36 Receiver
38 Control unit (of the charging device)
40 Secondary cell
42 Fuel cell
B Operating state
C Charge
C* Required charge
D Duration (of a past charging phase)
D* Probable duration (of the upcoming charging phase)
E Energy consumption
E* Probable energy consumption
L Past charging phase
L* Upcoming charging phase
N Past use phase
N* Subsequent use phase
S1 Step (prediction of the energy consumption)
S2 Step (prediction of the charging duration)
S3 Step (calculation of the charge)
S4 Step (planning of the charging process)
S5 Step (performance of the charging process)
Z Time interval

The invention claimed is:

1. A method for charging an energy storage unit of a mobile device which is alternately able to be charged in charging phases and able to be used in use phases, which comprises the steps of:
    determining a probable duration of an upcoming charging phase of the energy storage unit and a probable energy consumption of the energy storage unit of a subsequent use phase of the mobile device based on past charging phases of the energy storage unit and past use phases of the mobile device for the charging of the energy storage unit in the upcoming charging phase;
    calculating a required charge for the energy storage unit based on the probable energy consumption, wherein the required charge is rounded up to a maximum value which is at least 65% and at most 95% of a total capacity of the energy storage unit;
    outputting a notification if a value above the maximum value is calculated for the required charge;

setting a charging schema for charging the energy storage unit for the upcoming charging phase based on the required charge and the probable duration; and charging the energy storage unit during the upcoming charging phase according to the charging schema.

2. The method according to claim 1, which further comprises setting the charging schema for the upcoming charging phase such that the probable duration of the upcoming charging phase is used to a maximum to achieve the required charge.

3. The method according to claim 1, wherein the charging schema specifies a charging current and is selected such that the charging current is minimized during the probable duration of the upcoming charging phase to achieve the required charging.

4. The method according to claim 1, which further comprises using a 24-hour time frame in a determination of the probable energy consumption and the probable duration of the upcoming charging phase.

5. The method according to claim 1, which further comprises determining the probable energy consumption and the probable duration of the upcoming charging phase by means of a learning machine which is trained using the past use phases and using the past charging phases.

6. The method according to claim 1, which further comprises determining the probable energy consumption by virtue of the subsequent use phase being divided into a plurality of time intervals and by virtue of, based on the past use phases:

a) an interval energy consumption being determined for each of the time intervals, the interval energy consumption being an expected value for the probable energy consumption of the mobile device during a time interval; and b) the interval energy consumptions being summed.

7. The method according to claim 1, which further comprises determining the probable duration of the upcoming charging phase based on durations of the past charging phases.

8. The method according to claim 1, which further comprises using the probable energy requirement and/or the probable duration to stipulate an input for a sensor measurement.

9. The method according to claim 1, wherein the mobile device is a hearing aid.

10. The method according to claim 1, wherein the required charge is rounded up to a maximum value which is at least 85% and at most 95% of a total capacity of the energy storage unit.

11. A mobile device, comprising:
an energy storage unit; and
the mobile device configured for use in the method according to claim 1.

12. A charging device configured for charging an energy storage unit of a mobile device according to the method according to claim 1.

13. The charging device according to claim 12, further comprising:
a secondary cell functioning as a further energy storage unit from which the mobile device is able to be charged; and
an additional energy storage unit in order to charge said secondary cell.

14. The charging device according to claim 13, wherein said additional energy storage unit is a fuel cell.

15. A method for charging an energy storage unit of a mobile device which is alternately able to be charged in charging phases and able to be used in use phases, which comprises the steps of:
determining a probable duration of an upcoming charging phase of the energy storage unit and a probable energy consumption of the energy storage unit of a subsequent use phase of the mobile device based on past charging phases of the energy storage unit and past use phases of the mobile device for the charging the energy storage unit in the upcoming charging phase;
determining the probable energy consumption and the probable duration of the upcoming charging phase by means of a learning machine which is trained using the past use phases and using the past charging phases, wherein the learning machine includes a Bayesian network having a plurality of parent nodes which each represent a calendric feature, a location feature or an environmental feature and having a plurality of child nodes which each represent a time interval during which a particular operating state is active;
calculating a required charge for the energy storage unit based on the probable energy consumption;
setting a charging schema for charging the energy storage unit for the upcoming charging phase based on the required charge and the probable duration; and
charging the energy storage unit during the upcoming charging phase according to the charging schema.

16. A mobile device, comprising:
an energy storage unit; and
the mobile device configured for use in the method according to claim 15.

17. A charging device configured for charging an energy storage unit of a mobile device according to the method according to claim 15.

18. The charging device according to claim 17, further comprising:
a secondary cell functioning as a further energy storage unit from which the mobile device is able to be charged; and
an additional energy storage unit in order to charge said secondary cell.

19. The charging device according to claim 18, wherein said additional energy storage unit is a fuel cell.

20. The charging device according to claim 17, wherein the mobile device is a hearing aid.

* * * * *